Jan. 16, 1923.
L. FORTUNATO,
TALKING MACHINE.
FILED NOV. 29, 1920.
1,442,331.
2 SHEETS—SHEET 1.
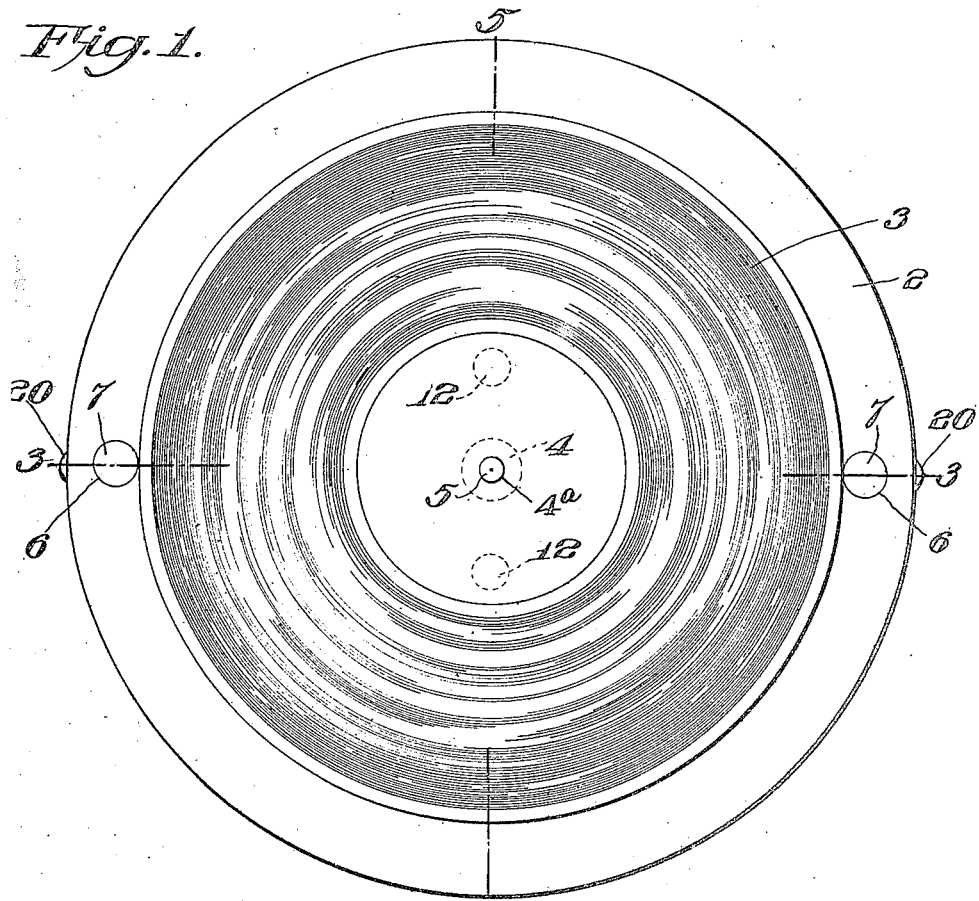
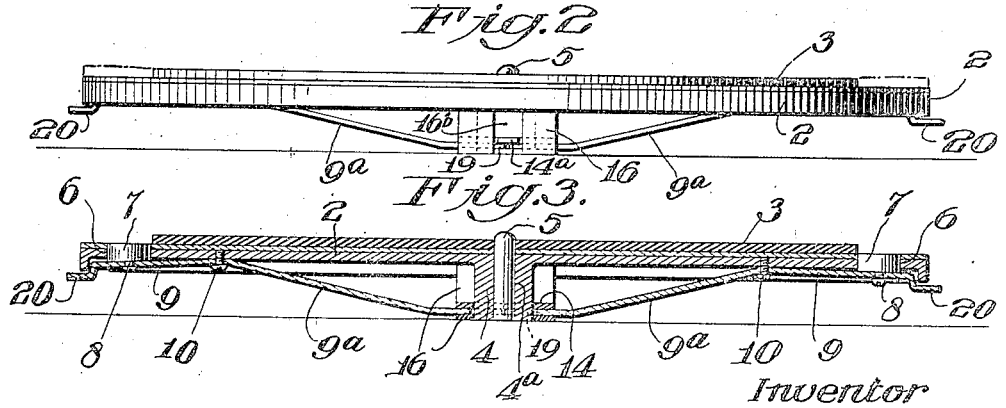
Inventor
Louis Fortunato
By H. V. Heuton
Attorney.

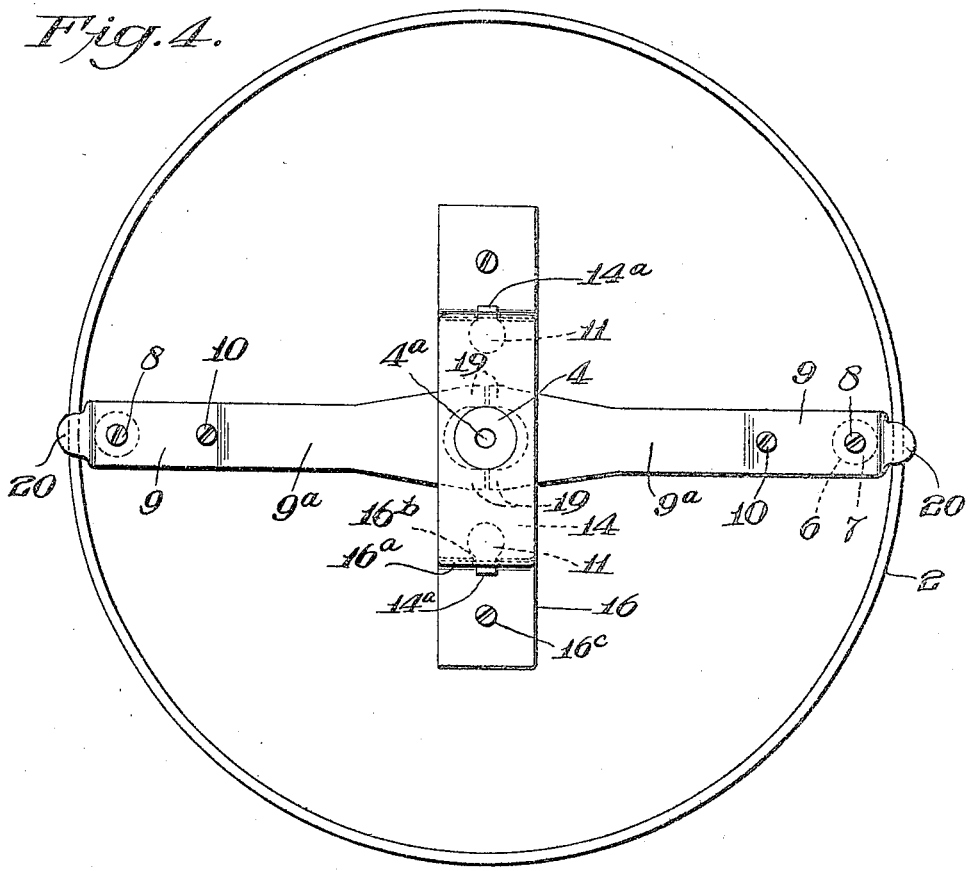

Patented Jan. 16, 1923.

1,442,331

UNITED STATES PATENT OFFICE.

LOUIS FORTUNATO, OF WILMINGTON, DELAWARE.

TALKING MACHINE.

Application filed November 29, 1920. Serial No. 426,986.

*To all whom it may concern:*

Be it known that I, LOUIS FORTUNATO, subject of the King of Italy, and residing at 709 North Union Street, Wilmington, Delaware, have invented certain new and useful Improvements in Talking Machines, of which the following is a full, clear, and exact description, reference being had to the accompanying drawings, forming a part of this specification.

My invention relates to talking machines of that type wherein a flat disk tablet record, on which the sound vibrations are cut or otherwise formed, is operatively supported on, and rotated by and with a rotatable turn table so actuated by a driven spindle. In devices of this type the record as well as the turn-table are usually circular in form, the record being sometimes of the same diameter and circumference as the turn table, but more frequently of lesser planular dimensions.

In such devices the turn-table usually has a depending hollow hub and the actuating spindle passes through such hub, the opening wherein terminates in a central aperture in the upper surface of the turn table, and the spindle extends slightly above the plane thereof, means being provided on the spindle whereby the internally squared hub of the turn table co-acts therewith to cause the turn table to rotate with it. The tablet or record is commonly made with a central aperture, through which the upper rounded end of the spindle, which projects above the plane of the turn table, is passed when the record is operatively and removably placed upon the turn table. The record is usually a very thin flat disk and, to remove it from the turn table after playing, usually requires the use of the fingers of both hands of the operator and even then is not easily removed; this being so whether the record is of the same or of lesser planular dimensions than the turn table.

My invention has for its object to remove that objection and it consists of the mechanical elements combined with and forming, mechanically and operatively, a part of the turn table, as hereinafter described, the essential and novel features of which are pointed out in the appended claims.

In the drawings illustrating my invention, Fig. 1 is a plan view of the device, with a tablet or record, of lesser planular dimensions than the turn table, in place thereon; Fig. 2 is a side elevation thereof, Fig. 3 is a section on line 3—3 of Fig. 1, Fig. 4 is an underside plan view of the mechanism showing its relation to the turn table proper; including in said figure, as well as in Figs. 2 and 3, a modification or rather an additional element to adapt the invention to tablets or records of the same planular dimensions as the turn table; and Fig. 5 is a section through Fig. 4 on the line 5—5 of Fig. 1.

Referring now to said drawings the turn table proper is indicated at 2, and the record tablet at 3, in Fig. 1, which also shows, in dotted lines, the driving hub 4 with its terminal hollow interior coincident with central aperture $4^a$ in the turn table, while at 5 is indicated the rounded terminal end of the actuating spindle which passes through the hollow hub and coinciding apertures in the turn table and record.

The characteristic features exemplifying the principle of the invention are, first in aperturing the turn table, adjacent its centre, preferably by two oppositely disposed apertures 12, 12, in the turn table, as shown in dotted lines in Fig. 1, extending through the same, and providing lifting plugs having a free rising and falling movement in said apertures, so proportioned and arranged that normally and inoperatively their top ends will not extend above, but be flush with, the upper plane of the turn table; and finally in providing manually operated means to cause these lifting plugs to rise in said apertures and slightly elevate the record on the turn table in order to readily remove the same, and permit said lifting means to return by gravity to normal and inoperative position thereafter.

These two apertures 12, 12, are located on each side of the spindle aperture $4^a$, and relatively central of the turn table, in order that the lifting plugs passing therethrough shall contact with that part of the under face of the record tablet within the central circular section thereof which is usually devoid of sound wave indentations.

Means to support these lifting plugs is shown as a plate 14, freely movable upwardly; it is centrally apertured to permit the free passage through it of the hub of the turn table and is preferably supplied with end guiding lugs $14^a$, which extend through slots $16^b$ in the flanges $16^a$ of a base plate 16 hereinafter described.

Means to cause a rise and fall of this freely movable plug-carrying plate 14 comprise a manually operable rocking lever, which is bent to consist of a horizontally disposed end 9, and an opposite end 9ª bent to a downward incline, and this lever is fulcrumed about midway of its length and at the point of its bend, to the under face of the turn table, by suitable means, as by a screw 10.

Near the circumferential edge of the turn table are provided two oppositely-disposed apertures, 6, 6, extending transversely through the body of that element of the device, though one of said apertures is sufficient under ordinary conditions of use. Extending upwards through these apertures and flush with the upper face thereof is located in each, a finger push button 7, 7, which is fastened, as by screw 8 to the straight end 9 of the rocking lever.

The inclined and free end 9ª of each rocking lever is preferably forked as indicated at 19 and extends to and loosely surrounds a half section of the hub of the turn table; said free ends of the two levers preferably not contacting but slightly spaced apart so that each lever can when desired, be separately rocked by the operator depressing its appropriate push button 7, only. Each of these free ends 9ª of the lever arm, so arranged, pass beneath the freely movable plate 14 on opposite ends of which is mounted the pair of lifting plugs 11, 11; and hence said lever when rocked imparts an upward movement to said plate and its lifting plugs, the return movement being effected by gravity, but the plate is suitably guided in its movement by being centrally apertured, as before stated the hub of the turn-table passing through this aperture; and preferably also by its lugs 14ª passing through slots in the plate 16 now to be described.

In order to support these elements, when released to so drop by gravity, a plate 16 is provided, secured by its two flanged ends 16ª, as by screws 16ᶜ to the base of the turn table, the central part of said plate being depressed below the plane of its flanges 16ª to allow of the free vertical movement therein of the plug-supporting plate 14, said depressed portion being centrally apertured to allow the actuating hub of the turn table to pass through it, and said depressed portion being of sufficient depth to allow of exactly the requisite upward play of said plate 14 whereby the top ends of its lifting plugs 11 when in normal and inoperative position are flush with the plane of the upper surface of the turn table, and when said plate 14 so drops, it rests upon the free ends of the inclined part 9ª of the rocking lever.

To adapt the device to also operate record tablets which coincide in planular dimensions with the turn table and hence cover the finger push buttons 7, I provide a narrow and short clip 20, on the operating end of the rocking lever, this clip extending very slightly beyond the circumferential edge of the turn table.

As shown and described and as I prefer to use it, the mechanism may be duplicated in certain of its elements, that is to say, it may have two oppositely disposed finger push buttons 7, or equivalent clips 20, each actuating a separate rocking lever, though each of the latter operates a single lifting plate 14, on which the pair of lifting plugs is mounted, while the fixed means to limit the gravity fall thereof is single; hence, as is obvious, a single rocking lever and its finger push button instead of two of said elements will in combination with the remaining elements effect the object desired though perhaps less easily or conveniently.

Having thus described my invention, I claim:

1. In a talking machine employing a flat disk record, the combination with a record-supporting turn table, apertured adjacent its centre and having a depending hub, a record-lifting element consisting of a vertically movable plate centrally apertured to surround said hub and guided thereby, said record lifting element including a lifting plug arranged to rise and fall in said aperture in the turn table, means operating to limit the falling movement of said record-lifting element and support it in normal lowered position, and means comprising a lever mounted on the under face of the turn table, operable to impart an upward movement to said lifting element and cause the record to be elevated above the plane of the turn table, and when released, to permit said lifting element to return, by gravity, to supported normal position.

2. In a talking machine of the class recited, in combination, a record-supporting turn table apertured at a point adjacent its centre and also apertured at a point adjacent its circumferential edge, a vertically movable record-raising element including a lifting plug mounted thereon and maintained thereby within said first mentioned aperture, flush with the upper surface of the turn table, when in normal position, and means to impart reciprocatory movement to said vertically movable element, said means comprising a lever mounted on the under face of the turn table, operable, when actuated, to raise said element and, when released, to permit it to return, by gravity, to normal lowered position, said lever including, on one end thereof, an operating push button occupying said aperture adjacent the circumferential edge of the turn table.

3. In a talking machine of the class recited, the combination with a record-supporting turn table, apertured adjacent its centre, a vertically movable record-lifting element comprising a vertically-movable guided member, including as a part thereof a lifting plug mounted thereon and maintained normally within said aperture and operable to be raised above and return within the same by gravity, when said lifting element is raised and then released, and means comprising a lever operatively mounted on the under face of the turn table and having an end extending to and below said movable member to actuate it and an oppositely-disposed free end extending slightly beyond the circumferential edge of the turn table and terminating thereat in an operating finger clip.

4. In a talking machine of the class recited, the combination with a record-supporting turn table, apertured at two oppositely-disposed points relatively to its central operating hub, a record-lifting element comprising two lifting plugs maintained within and adapted to rise and fall in said apertures, including supporting means of which said lifting plugs form an operative part, and means comprising a rocking lever mounted on the under face of the turntable, operating, when depressed at its free end, to actuate said record-lifting element and raise the disc record into a horizontal plane above and parallel with that of the turn table and, when released to permit it to return, by gravity, to normal lowered position.

5. In a talking machine of the class recited, the combination with a record-supporting turn table, apertured at two oppositely-disposed points adjacent its centre, a record-lifting element comprising a pair of lifting plugs arranged to rise and fall in said apertures, including a vertically movable member of which said lifting plugs form an operative part, a member fixed to and spaced from the base of the turn table and operating to limit the downward movement of said lifting element to initial position, and a lever mounted on the under face of the turn table and having a free end extending between said movable plate and said fixed member adapted, when manually depressed at its operating end, to raise said record-lifting element and, when released, to permit it to return, by gravity, to initial lowered position.

6. In a talking machine of the class recited, the combination with a record-supporting turn table, apertured adjacent its center and having a depending hub, a record-lifting element comprising a lifting plug arranged to rise and fall in said aperture, said element including a vertically movable plate, centrally apertured to surround said hub and be guided thereby in its reciprocation, means to actuate said lifting element, consisting of a pivoted rocking lever having a forked end surrounding said hub, beneath said vertically movable plate, and operable to cause the lifting plug of said element to rise above the plane of the turn table and return to normal position by gravity, and supporting means mounted on the under face of the turn table and operable to limit the return movement of said last mentioned elements to normal lowered position.

7. In a talking machine of the class recited, the combination of the following instrumentalities, namely, a turn table apertured adjacent its centre and having a depending operating hub, a basal supporting member secured to and spaced from the under side of the turn table, said member having end walls which are slotted, a record-lifting plug arranged to rise and fall in said aperture in the turntable, a vertically movable member of which said lifting plug forms an operative part, said movable member having guiding portions extending into said slots in the supporting member, and means including a rocking lever having a forked lifting end extending between said movable member and said fixed supporting member and loosely embracing said hub, said lever operating when manually depressed to raise said movable member and its lifting plug, and, when released, to permit it to return by gravity to normal lowered position.

In testimony whereof, I have hereunto affixed my signature this 22nd day of November, A. D. 1920.

LOUIS FORTUNATO.

Witnesses:
I. M. TUNIS,
J. E. TURNER.